United States Patent [19]
Dell

[11] Patent Number: 5,942,753
[45] Date of Patent: Aug. 24, 1999

[54] INFRARED REMOTE SENSING DEVICE AND SYSTEM FOR CHECKING VEHICLE BRAKE CONDITION

[75] Inventor: William C. Dell, Tucson, Ariz.

[73] Assignee: Remote Sensing Technologies, Tucson, Ariz.

[21] Appl. No.: 08/819,696

[22] Filed: Mar. 12, 1997

[51] Int. Cl.[6] ................................................. G01N 21/00
[52] U.S. Cl. .................................. 250/338.1; 250/339.14
[58] Field of Search ........................... 250/338.1, 339.04, 250/339.14; 374/45, 121

[56] References Cited

U.S. PATENT DOCUMENTS

| | | | |
|---|---|---|---|
| 5,133,605 | 7/1992 | Nakamura | 374/124 |
| 5,730,526 | 3/1998 | Davis et al. | 374/45 |

*Primary Examiner*—Edward P. Westin
*Assistant Examiner*—Richard Hanig
*Attorney, Agent, or Firm*—Hunton & Williams

[57] ABSTRACT

An infrared remote sensing device and system for determining or allowing an inspector to determine whether a motor vehicle warrants an enhanced safety inspection to detect a defective or faulty brake system. The infrared remote sensing system includes a video recording device for recording the vehicle and providing video information, an infrared remote sensing device for detecting infrared energy from a plurality of brake drums of the vehicle and providing data, a power supply for providing power to the infrared remote sensing device, a computer for receiving the video information from the video recording device and the data from the infrared remote sensing device, the computer for performing analysis of the data from the infrared remote sensing device and providing analyzed data, a display device for displaying the video information and the analyzed data from the computer; wherein an inspector can view the video information and the analyzed data on the display device which indicates irregularities in heat patterns of the plurality of brake drums to determine the brake condition of the vehicle.

21 Claims, 6 Drawing Sheets

INFRARED REMOTE SENSING DEVICE AND SYSTEM FOR CHECKING VEHICLE BRAKE CONDITION

BACKGROUND OF THE INVENTION

Defective and faulty brake systems on motor vehicles including trucks are hazardous to pedestrians, drivers, passengers and other vehicles. Presently, safety inspections including the examination of brake systems of motor vehicles are performed to reduce the number of vehicles with defective or faulty brake systems operating on the roadways. At present, however, there is no system that can be positioned on the roadway to perform an initial inspection to determine, or to assist an inspector in determining, which vehicles' brake systems warrant an enhanced safety inspection.

One of the current methods for performing such preliminary inspections involves an inspector selecting a small percentage of the vehicles traveling on the roadway to be subjected to an enhanced safety inspection of the vehicle, including the brake system. This current method for choosing which vehicles may be likely to fail a safety inspection as a result of a defective or faulty brake system is subjective and based upon the appearance of the vehicle, the driver, or both. Although this method has resulted in detecting vehicles with defective or faulty brake systems, a more efficient system is needed.

BRIEF SUMMARY OF THE INVENTION

The present invention utilizes an infrared remote sensing device positioned to monitor a lane of a roadway and an infrared remote sensing system. The infrared remote sensing device is simultaneously directed toward both sides of the lane in order to measure the infrared energy, that is, the temperature, radiated from the plurality of brake drums of a vehicle as the vehicle is decelerating by application of the brake system; for example, in a pull-over lane.

In view of the foregoing, it is one object of the present invention to provide an apparatus and system for identifying motor vehicles which may have defective or faulty brake systems and providing a preliminary inspection thereto.

It is another object of the present invention to provide an apparatus and system for remotely performing a preliminary inspection of the brake systems of motor vehicles under actual operating conditions to determine whether a more thorough safety inspection to the vehicle is warranted.

Another objective of the present invention is to detect heat differences of a plurality of brake drums of a vehicle while in a decelerating state on a roadway.

Still another object of the present invention is to increase the efficiency of safety inspections and to deter intentional tampering with the vehicles' brake systems.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages, of the present invention.

BRIEF DESCRIPTION OF THE SEVERAL VIEWS OF THE DRAWINGS

For the purpose of facilitating an understanding of the invention there is illustrated in the accompanying drawings a preferred embodiment thereof, from an inspection of which, when considered in connection with the following description, the invention, its construction and operation, and many of its advantages should be readily understood and appreciated.

DETAILED DESCRIPTION OF THE DRAWINGS

Devices have been developed in the past such as U.S. Pat. No. 5,489,777 (Stedman, et al.) to determine engine temperature from a passing motor vehicle by examining infrared ("IR") emissions. The present invention, however, is not related to the determination of engine temperature, rather it is an enhancement to a safety inspection system to determine defective or faulty brake systems.

None of the prior art systems objectively and remotely measure the infrared energy of the plurality of brake drums of a motor vehicle on a roadway under actual operating conditions including in a decelerating state. Therefore, a need exists for a system to remotely inspect the brake drums of a vehicle to determine if a more thorough safety inspection of the vehicle is warranted.

Figure 1:
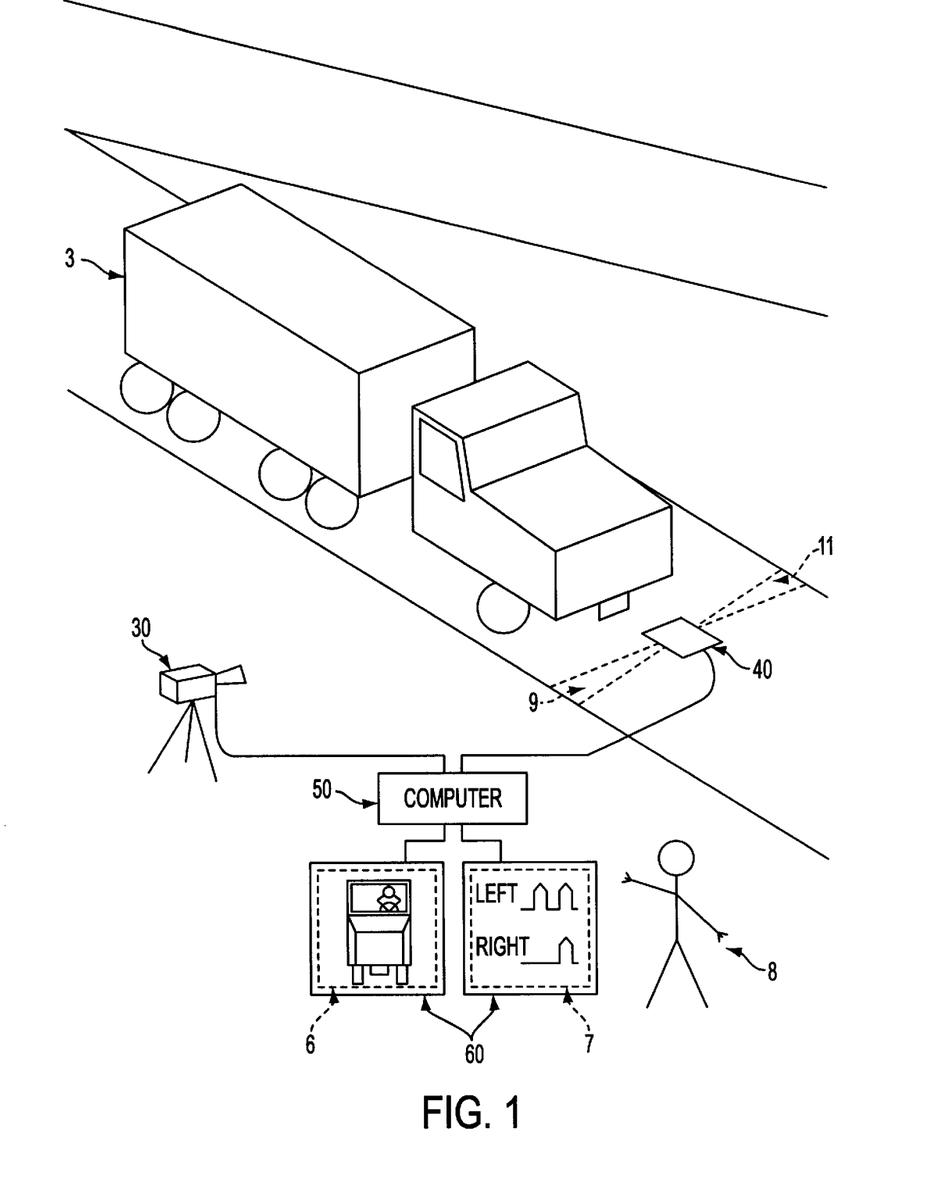
FIG. 1 is a pictorial view of an embodiment of the present invention shown in use across a roadway.
Figure 2:
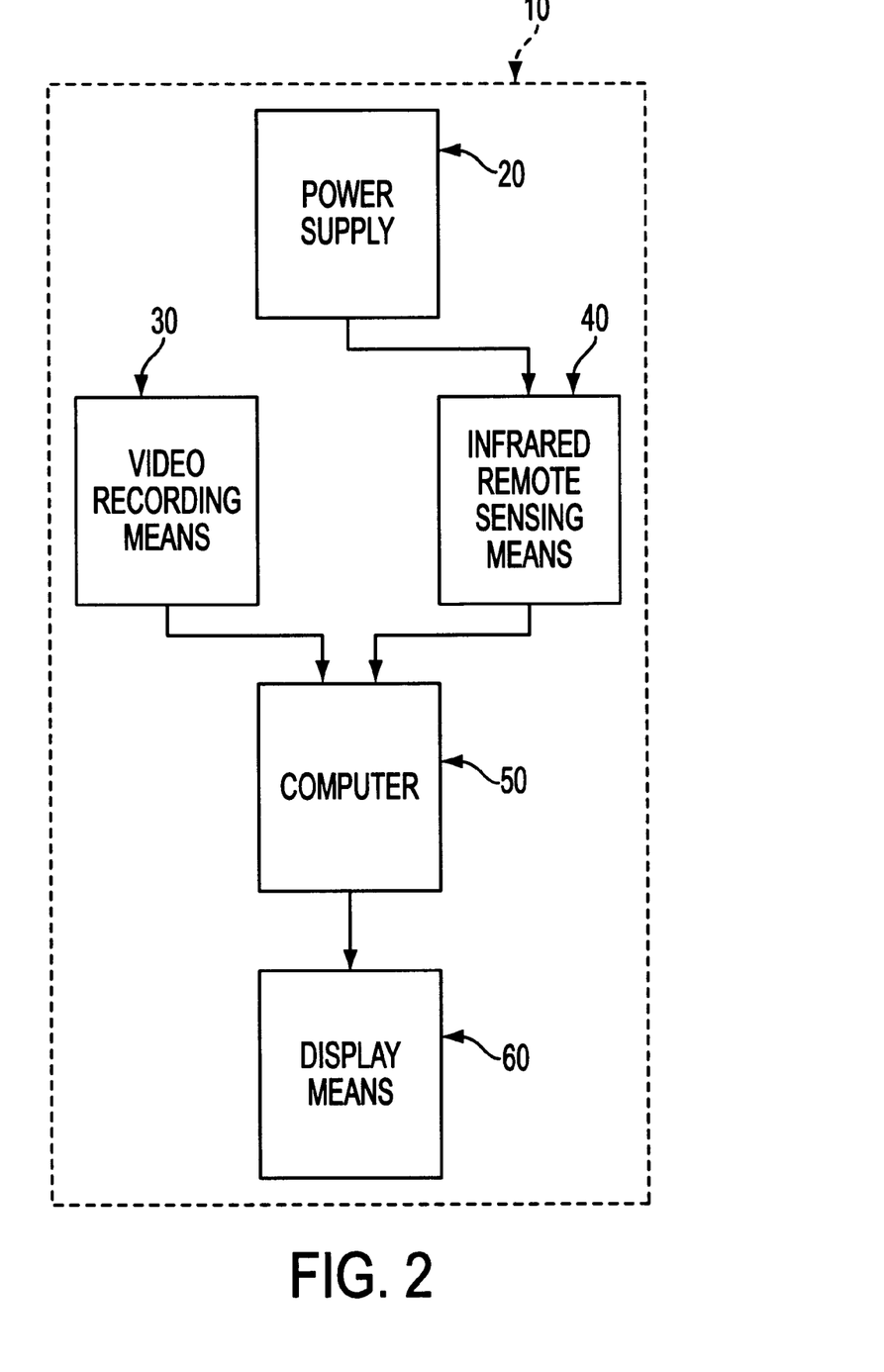
FIG. 2 is a block diagram of an embodiment of the present invention.
Figure 3:
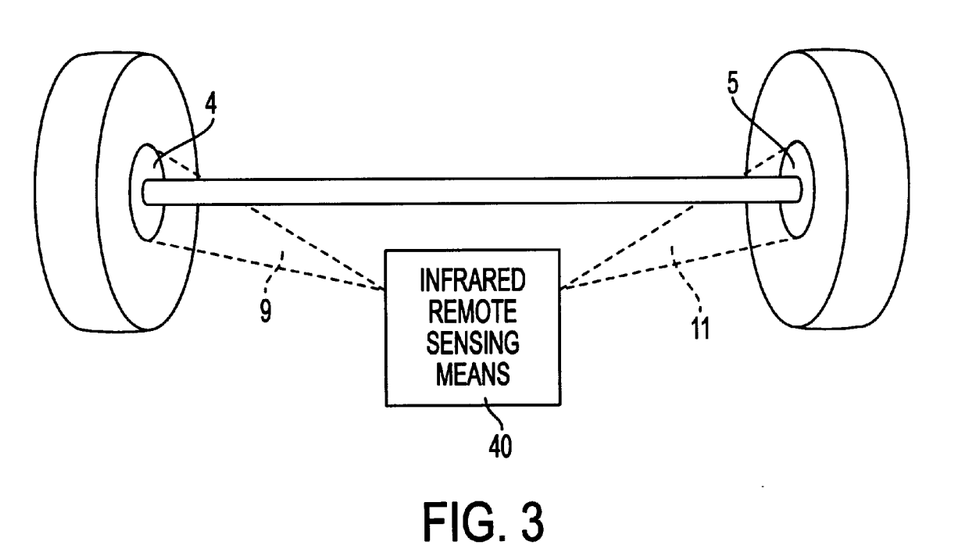
FIG. 3 is a pictorial view of a portion of the present invention.

FIG. 1 illustrates one embodiment of the present invention in use along a roadway 2. A motor vehicle 3 having at least a pair of brake drums 4,5 as shown in FIG. 3 and traveling along a roadway 2 is illustrated in FIG. 1. As shown in the block diagram of FIG. 2, this embodiment of the present invention includes a video recording device 30 for recording the vehicle 3 and providing video information 6, infrared remote sensors 40 for detecting infrared energy from the brake drums 4, 5 of the vehicle 3 and providing data relating thereto, a power supply 20 for providing power to the infrared remote sensors 40, a computer 50 for receiving the video information 6 from the video recording device 30 and the data from the infrared remote sensors 40 and for performing analysis of the data from the infrared remote sensors 40 and providing analyzed data 7, and a display 60 for displaying the video information 6 and the analyzed data 7 from the computer 50. Using the display 60 an inspector 8 can view the video information 6 and the analyzed data 7 on the display 60 which indicate irregularities in heat patterns of the plurality of brake drums 4, 5 to determine whether to subject the brakes of the vehicle 3 to an enhanced safety inspection. In an alternate embodiment, the computer can determine by conventional analysis whether an enhanced safety inspection of the brakes of the vehicle is warranted.

As shown in FIGS. 1 and 3 the infrared remote sensing 40 is placed at road level in the middle of a lane of the roadway 2. The infrared remote sensing device 40 includes a plurality of viewing regions 9, 11, that is, fields of view. In a preferred embodiment, the infrared remote sensing device 40 includes the two viewing regions 9, 11 in which each viewing region is arranged opposite each other, that is, directed outwardly from the middle of the lane of the roadway 2. When a vehicle 3 passes over the infrared remote sensing device 40 as shown in FIG. 3, each one of the viewing regions 9, 11 includes one of the plurality of brake drums 4,5, respectively. The infrared remote sensing device 40 can detect the infrared energy, that is, temperature, emitted from each of the plurality of brake drums 4,5, simultaneously.

The infrared remote sensing device 40 provides data to the computer 50 for performing conventional analysis of the data in which the computer 50 provides analyzed data 7 to the display 60. The computer 50 may also include a conventional data storage (not shown) for storing the data and/or analyzed data 7. In another embodiment, the computer 50 includes a conventional video storage (not shown) for storing the video information 6.

Figure 4:
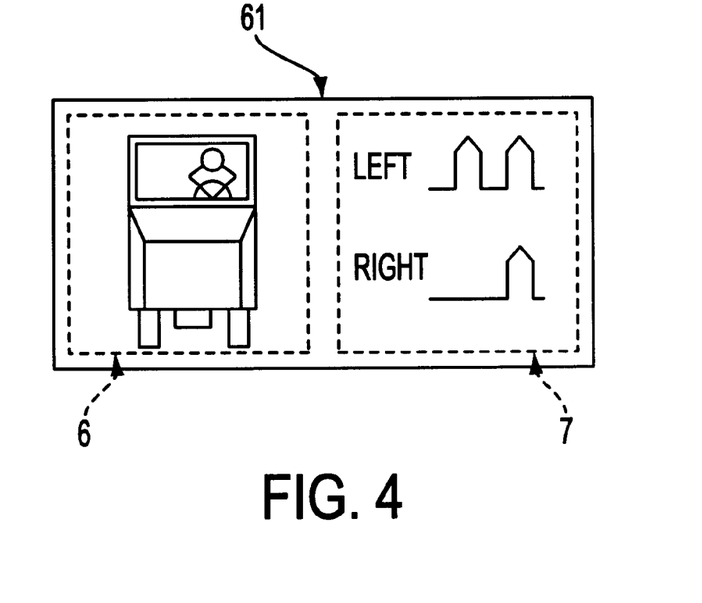
FIG. 4 is a pictorial view of one embodiment of the display means of the present invention.

A video recording device 30 identifies and records the vehicle 3 subject to a preliminary inspection by the infrared remote sensing device 40 and provides video information 6 to the computer 50. In one embodiment, the video recording device 30 may include a vehicle identifying device, such as a video camera, for recording a view of the vehicle subject to the preliminary inspection or portion thereof, including the license plate of the vehicle. Such vehicle identifying device may include a freeze-frame video system that would take a picture, that is, video information 6, of the vehicle 3 subject to a preliminary inspection of the brake system and enable the video information 6 and the analyzed data 7 to be placed upon the same computer screen, as shown in FIG. 4. The video recording device may also include a conventional video storage (not shown) to allow the video information 6 to be stored and accessed numerous times.

Figure 5:
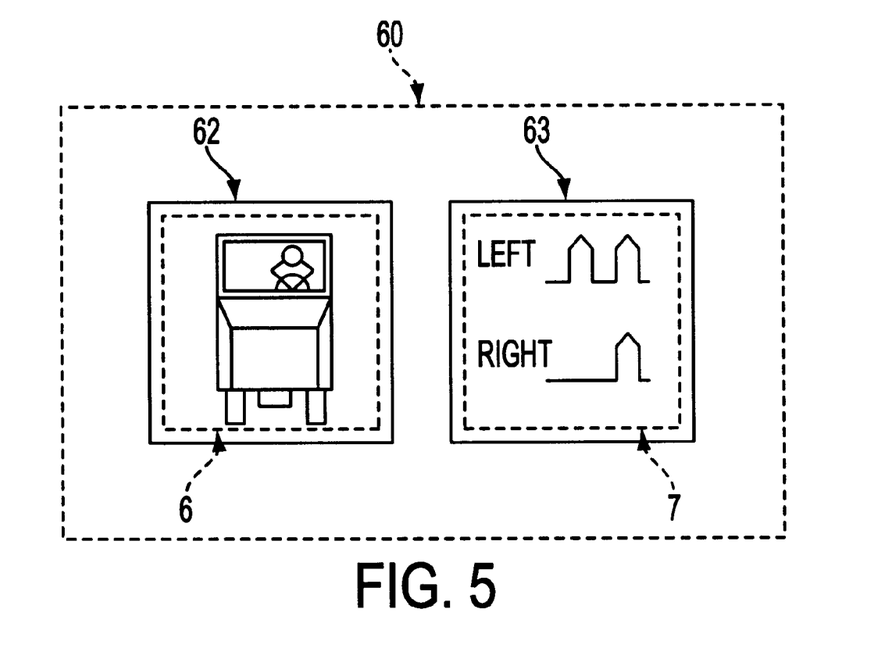
FIG. 5 is a pictorial view of another embodiment of the display means of the present invention.

The video information 6 is provided to the display 60. The display 60 may include any displaying apparatus such as CRT monitors, digital monitors, printers, and may include one monitor 61 that displays the video information 6 and analyzed data 7 side-by-side on the same monitor 61, as shown in FIG. 4, or the display 60 may include a plurality of monitors 62, 63 in which the video information 6 and the analyzed data 7 are respectively displayed on separate monitors 62, 63 as shown in FIG. 5.

A properly functioning brake system of a vehicle 3 will cause the brake drums 4, 5 to get hot. Hot brake drums emit radiant energy in the infrared. It is well known that the intensity of infrared radiation emitted by an object increases with temperature. Thus, a hot object will emit substantially more infrared radiation than a cold object. Infrared detectors 16, 17 such as thermal detectors and quantum detectors measure the radiant energy of objects. Thermal detectors respond to the heating effect of the infrared radiation and include thermocouples, thermistors, and pyroelectric detectors. Quantum detectors include photovoltaic and photoconductive detectors. Of these infrared detectors, quantum detectors generally have a higher specific detectivity than thermal detectors, although thermal detectors have the advantage of flat response over a wide wavelength range. PbSe and PbS detectors, however, may be selected as the most appropriate for the present invention for several reasons including spectral response and cost. The preferred plurality of infrared detectors 16, 17 are two Peltier device cooled PbSe IR detectors.

Figure 6:
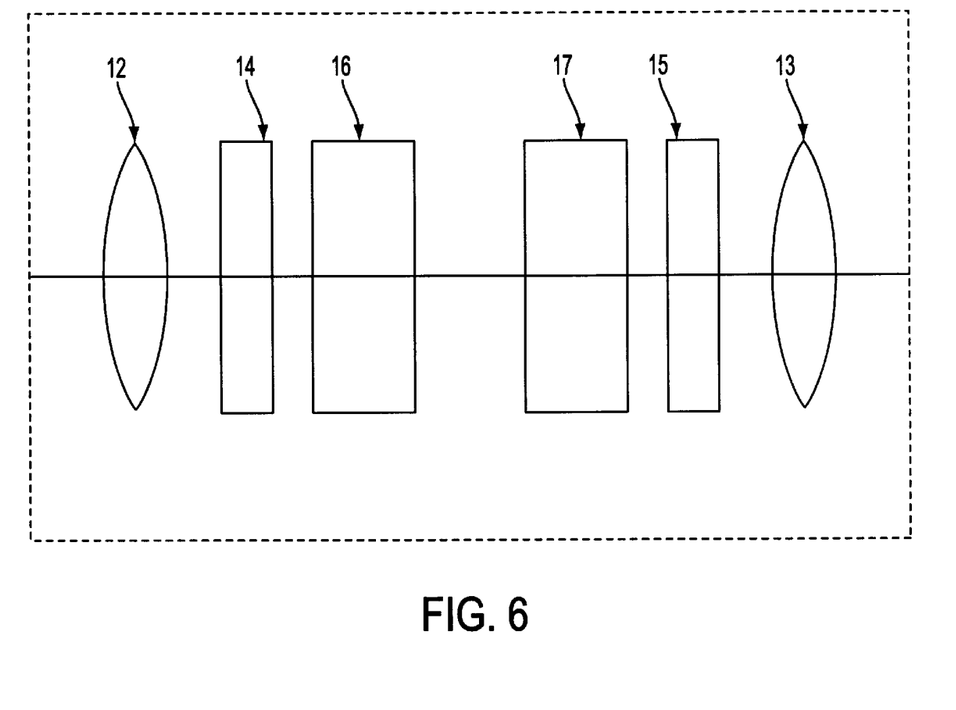
FIG. 6 is an illustrative view of the infrared remote sensing device of the present invention.

In a preferred embodiment, illustrated in FIG. 6, the infrared remote sensing device 40 includes two infrared lenses 12, 13, two choppers 14, 15, and two infrared detectors 16, 17. The infrared lenses 12, 13 focus infrared energy from predefined fields of view 9, 11 onto the infrared detectors 16, 17. Each of the choppers 14, 15 are respectively positioned between a detector and lens and alternately blocks and unblocks the infrared energy directed towards the infrared detectors 16, 17. This causes the infrared detectors 16, 17 to generate data that alternates between a reference value and a value corresponding to the intensity of infrared energy. The reference values of the data generated by the infrared detectors 16, 17 may be used to provide a baseline for calibration of the infrared remote sensing device 40. The plurality of choppers 14, 15 as shown in FIG. 6 may include optical choppers such as tuning fork choppers, spinning wheel or disk choppers, or spinning mirror choppers.

The plurality of infrared lenses 12, 13 as shown in FIG. 6, may include any IR transparent material including but not limited to ZnSe, $CaF_2$, and Ge. The plurality of infrared lenses 12, 13 are arranged to allow their viewing regions 9, 11 to include a plurality of brake drums 4, 5 of a vehicle 3 passing above the infrared remote sensing device 40, and focus infrared energy from the plurality of brake drums 4,5 onto the plurality of infrared detectors 16, 17. The infrared remote sensing device 40, can simultaneously detect the infrared energy from each pair of brake drums of the vehicle 3, such as each one of a pair of brake drums attached to the same axle of the vehicle. The infrared lenses 12, 13 can also be replaced by conventional mirrors (not shown). The infrared remote sensing device 40 can include conventional preamplifier and data acquisition circuits (not shown) to acquire and display the data and/or analyzed data.

The display 60 can display the analyzed data 7 for each of the plurality of brake drums simultaneously or any combination of the plurality of brake drums thereof along with the video information 6. For instance, FIG. 5 shows video information 6 of a vehicle 6 and analyzed data 7 of a left brake drum and a right brake drum on the same axle of a vehicle 3. In addition, the left brake drum and right brake drum for each axle of the vehicle can be displayed on the display 60 simultaneously, sequentially, or in any order to allow an inspector to view irregularities in heat patterns of the plurality of brake drums to determine whether to subject the brake condition of the vehicle 3 to an enhanced safety inspection.

In another embodiment, the computer can perform a conventional analysis to determine whether the brake condition of the vehicle warrants an enhanced safety inspection. One such conventional analysis includes comparing the data obtained by the infrared remote sensing device 40 with predefined threshold values to determine if the data is above or below the predefined values. The result of such an analysis and comparison will determine whether an enhanced safety inspection of the brake condition of the vehicle is warranted.

Figure 7:
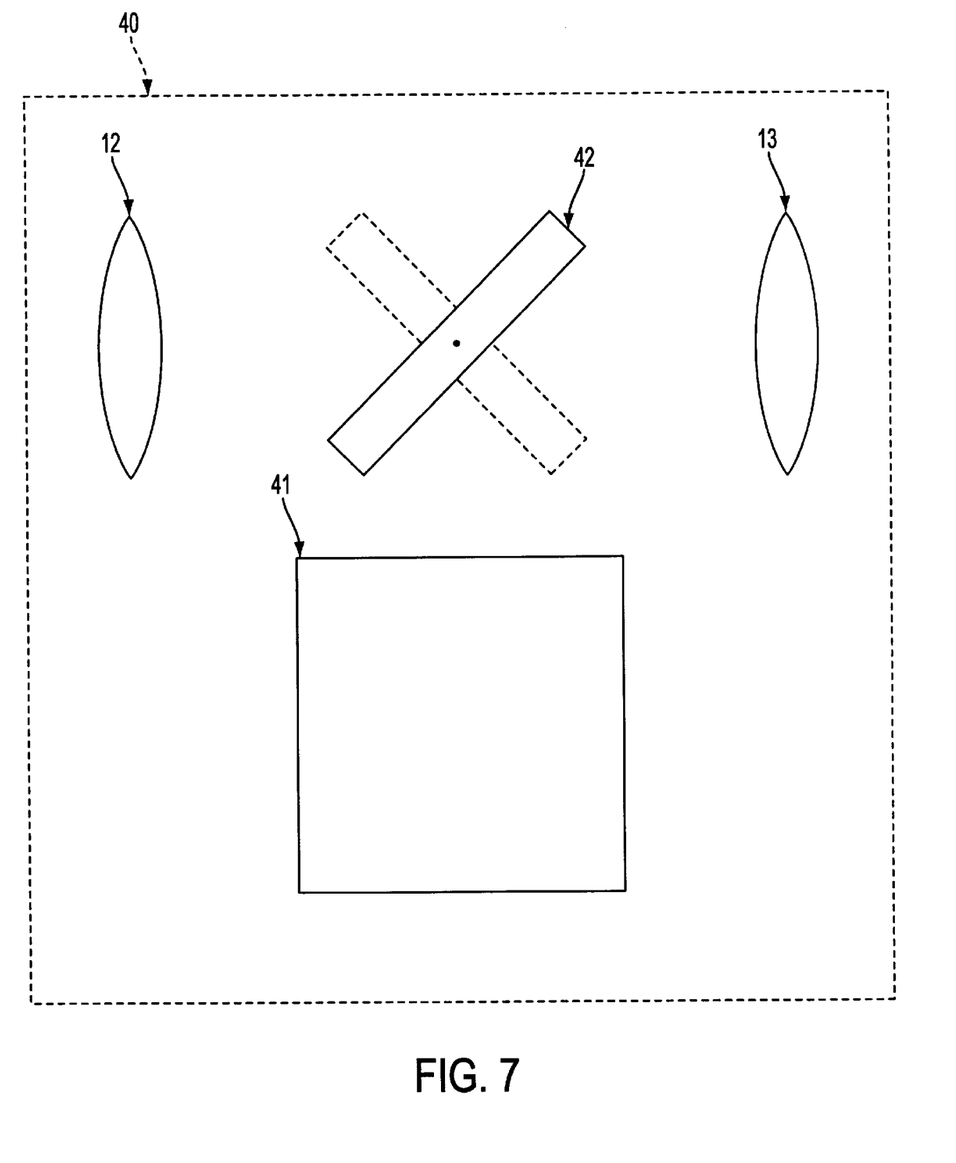
FIG. 7 is an illustrative view of another embodiment of the infrared remote sensing device of the present invention.

In an alternate embodiment, as shown in FIG. 7, the infrared remote sensing device 40 may include one infrared detector 41, one spinning mirror chopper 42, and a plurality of lenses 12, 13. Such a construction simplifies the infrared remote sensing device 40 and reduces the cost by decreasing the number of detectors and choppers needed.

In another alternative embodiment, the infrared remote sensing device 40 includes a conventional construction of the A/C coupling of the detector without requiring a chopper (not shown). Such a construction allows instrument simplification, however, a slight decrease in signal-to-noise ratio may result.

Thus, there has been described an apparatus for identifying motor vehicles and performing an initial inspection upon the brake system of the vehicle to determine if an enhanced safety inspection is warranted. While the invention has been described in connection with preferred and illustrative embodiments, it should be understood that variations will occur to those skilled in the art, and the invention is to be limited only by the claims appended hereto and equivalents.

I claim:

1. An infrared remote sensing system for use by an inspector in performing a preliminary inspection of a brake condition of a vehicle functioning under actual operating conditions comprising:

recording means for recording sufficient information to identify the vehicle functioning under actual operating conditions and providing information;

infrared remote sensing means having a plurality of predefined fields of view for detecting infrared energy from a plurality of brake drums of the vehicle functioning under actual operating conditions and providing data;

a power supply for providing power to the infrared remote sensing means;

a computer for receiving said information from said recording means and said data from said infrared remote sensing means, wherein said computer performs analysis of said data from said infrared remote sensing means and provides analyzed data; and display means for displaying said information and said analyzed data from said computer, wherein the inspector can view said information to identify a particular vehicle and said analyzed data on said display means which indicates irregularities in heat patterns of the plurality of brake drums to determine whether the brake condition of the vehicle be subject to an enhanced safety inspection.

2. The infrared remote sensing system according to claim 1, wherein said infrared remote sensing means further comprises:

a plurality of infrared lenses, each of said plurality of infrared lenses having a respective viewing region;

a plurality of infrared detectors for detecting the infrared energy from said plurality of brake drums of the vehicle; and a plurality of choppers positioned between said plurality of infrared lenses and said plurality of infrared detectors, respectively, for interrupting flow of the infrared energy from said plurality of infrared lenses to said plurality of infrared detectors.

3. The infrared remote sensing system according to claim 2, wherein said plurality of infrared lenses equals two lenses; said plurality of choppers equals two choppers; and said plurality of infrared detectors equals two detectors.

4. The infrared remote sensing system according to claim 3, wherein each viewing region of said two lenses is arranged opposite each other.

5. The infrared remote sensing system according to claim 3, wherein said two infrared detectors simultaneously detect the infrared energy from at least two of said plurality of brake drums of the vehicle.

6. The infrared remote sensing system according to claim 2, wherein said plurality of choppers are optical tuning fork choppers.

7. The infrared remote sensing system according to claim 1, wherein said display means comprises one monitor for simultaneously displaying said video information and said analyzed data.

8. An infrared remote sensing device for detecting a brake condition of a vehicle functioning under actual operating conditions comprising:

infared remote sensing means for detecting infared energy from a pularlity of brake drums of the vehicle functioning under actual operating conditions;

wherein said infrared remote sensing means includes;

a plurality of infrared lenses, said plurality of infrared lenses each having predefined fields of view;

a plurality of infrared detectors for detecting the infared energy from said plurality of brake drums of the vehicle functioning under actual operating conditions; and a plurality of choppers positioned between said plurality of infrared lenses and said plurality of infrared detectors, respectively, for interrupting flow of the infrared lenses and said plurality of infrared lenses to said plurality of infrared detectors.

9. The infrared remote sensing device according to claim 8, wherein said plurality of infrared lenses equals two-lenses; said plurality of choppers equals two choppers; and said plurality of infrared detectors equals two detectors.

10. The infrared remote sensing device according to claim 9, wherein each viewing region of said two lenses is arranged opposite to each other.

11. The infrared remote sensing device according to claim 9, wherein said two infrared detectors simultaneously detect the infrared energy from at least two of said plurality of brake drums, respectively, of the vehicle.

12. The infrared remote sensing device according to claim 8, wherein said plurality of choppers are optical tuning fork choppers.

13. An infrared remote sensing system for performing an inspection of a brake condition of a vehicle functioning under actual operating conditions comprising:

recording means for recording sufficient information to identify the vehicle functioning under actual operating conditions and providing information about said vehicle;

remote sensing means having a plurality of predefined fields of view for detecting infrared energy from a plurality of brake drums of said vehicle functioning under actual operating conditions and providing data;

a computer for receiving and processing said information and said data; and display means for displaying said processed information and said data.

14. The infrared remote sensing system of claim 13, wherein said remote sensing means are located at road level in the middle of a lane of roadway.

15. The infrared remote sensing system of claim 13, wherein said remote sensing means include at least two viewing regions.

16. The infrared remote sensing system of claim 13, wherein said remote sensing means detect the infrared energy from a plurality of brake drums simultaneously.

17. The infrared remote sensing system of claim 13, wherein said recorder means is a video recorder.

18. The infrared remote sensing system of claim 13, wherein said computer can store or transmit said information or data.

19. A method of remotely sensing the brake condition of a vehicle functioning under actual operating conditions using an infrared sensing means, a recorder, a computer, and a display, comprising the steps of:

detecting the infrared energy emitted from at least one brake drum of said vehicle functioning under actual operating conditions using at least one infrared lens having a predefined field of view;

providing data on said detected infrared energy to said computer;

recording information about said vehicle functioning under actual operating conditions, which information is sufficient to identify the vehicle and providing said information to said computer;

receiving and processing said data and said information by said computer; and displaying said data and said information.

20. The method of claim 19, wherein said infrared sensing source is located at road level in the middle of a lane of roadway.

21. The method of claim 19, wherein said infrared sensing source detects the infrared energy emitted from at least two vehicle brake drums simultaneously.

* * * * *